(12) United States Patent
Asano et al.

(10) Patent No.: US 6,904,334 B2
(45) Date of Patent: Jun. 7, 2005

(54) ROBOT APPARATUS AND METHOD FOR CONTROLLING THE OPERATION THEREOF

(75) Inventors: Yasuharu Asano, Kanagawa (JP); Junichi Yamashita, Saitama (JP)

(73) Assignee: Sony Corporation, Tokyo (JP)

( * ) Notice: Subject to any disclaimer, the term of this patent is extended or adjusted under 35 U.S.C. 154(b) by 111 days.

(21) Appl. No.: 10/390,494

(22) Filed: Mar. 17, 2003

(65) Prior Publication Data

US 2004/0015265 A1 Jan. 22, 2004

(30) Foreign Application Priority Data

Mar. 18, 2002 (JP) ........................................ 2002-075147

(51) Int. Cl.[7] .............................................. G06F 19/00
(52) U.S. Cl. ...................... 700/245; 700/246; 700/253; 700/249; 700/258; 318/568.12; 318/587; 318/490; 340/241; 340/587; 340/552; 340/556; 219/219; 219/130; 701/23
(58) Field of Search ................................ 700/245, 264, 700/253, 249, 258; 318/568.12, 587, 490; 340/541, 587, 552, 565; 219/130.01; 701/23

(56) References Cited

U.S. PATENT DOCUMENTS

| 4,245,430 A | * | 1/1981 | Hoyt ........................... 446/175 |
| 4,870,623 A | * | 9/1989 | Buckley et al. ................. 367/7 |
| 5,906,754 A | * | 5/1999 | Appel et al. ................... 216/88 |
| 6,308,114 B1 | * | 10/2001 | Kim ............................ 700/245 |

OTHER PUBLICATIONS

Hirai et al., The development of Honda humanoid robot, 1998, IEEE, pp. 1321–1326.*
Breazeal et al., Infant–like social interactions between a robot and a human caregiver, 1998, Internet, pp. p.1–p.57.*
Sloman et al., Architectures and tools for human–like agents, 1998, Internet, pp. 1–9.*

* cited by examiner

*Primary Examiner*—Thomas G. Black
*Assistant Examiner*—McDieiunel Marc
(74) *Attorney, Agent, or Firm*—Frommer Lawrence & Haug LLP; William S. Frommer

(57) ABSTRACT

A robot apparatus which may be turned to a sound source direction by a spontaneous whole-body concerted operation. With the possible range of rotation of the neck unit of a robot apparatus 1 of ±Y° and with the relative angle of the direction of a sound source S to the front side of the robot apparatus 1 of X°, the entire body trunk unit of the robot apparatus 1 is rotated through (X−Y)°, using the leg units, while the neck joint yaw axis of the robot apparatus is rotated through Y° to the direction of the sound source S, so that the robot apparatus is turned to the direction of the sound source S. If the robot apparatus 1 has found the face of a person already known to the robot apparatus through previous learning and has verified that the person has accosted the apparatus, the body trunk unit is rotated through Y°, at the same time as the neck joint yaw axis is rotated through −Y° to eliminate neck distortion as the apparatus is gazing at the object, so that the apparatus may face the sound source S aright by a spontaneous operation.

18 Claims, 15 Drawing Sheets

| node 100 | INPUT EVENT NAMES | DATA NAMES | DATA RANGES | PROBABILITY OF TRANSITION TO OTHER NODES | | | | | |
|---|---|---|---|---|---|---|---|---|---|
| | | | | A | B | C | D | | n |
| NODE OF DESTINATION OF TRANSITION | | | | node 120 | node 120 | node 1000 | | | node 600 |
| OUTPUT BEHAVIOR | | | | ACTION 1 | ACTION 2 | MOVE BACK | | | ACTION 4 |
| 1 | BALL | SIZE | 0.1000 | 30% | | | | | |
| 2 | PAT | | | | 40% | | | | |
| 3 | HIT | | | | 20% | | | | |
| 4 | MOTION | | | | | | | | |
| 5 | OBSTACLE | DISTANCE | 0.100 | | | 50% | | | |
| 6 | | JOY | 50.100 | | | 100% | | | |
| 7 | | SURPRISE | 50.100 | | | | | | |
| 8 | | SADNESS | 50.100 | | | | | | |

ROBOT APPARATUS AND METHOD FOR CONTROLLING THE OPERATION THEREOF

BACKGROUND OF THE INVENTION

1. Field of the Invention

This invention relates to a robot apparatus of the type walking on two feet, such as human being, performing autonomous operations simulating the bodily mechanism or movements, and a method for controlling the movements. More particularly, it relates to a robot apparatus having the function of estimating the sound source direction and performing the movement of turning to the sound source direction by a concerted full-body movement, and a method for controlling the movements. This application claims priority of Japanese Patent Application No.2002-075147, filed on 2002, the entirety of which is incorporated by reference herein.

2. Description of Related Art

A mechanical apparatus for performing movements simulating the movement of the human being, using electrical or magnetic operation, is termed a "robot". The robots started to be used widely in this country towards the end of the sixtieth. Most of the robots used were industrial robots, such as manipulators or transporting robots, aimed at automation or unmanned operations in plants.

Recently, development in practically useful robots, supporting the human life as a partner, that is supporting the human activities in various aspects of our everyday life, such as in living environment, is progressing. In distinction from the industrial robots, these practically useful robots are endowed with the ability to learn for themselves the method for adaptation to the human being with variable personalities, or to variable environments in variegated aspects of our everyday life. For example, pet-type robots, simulating the bodily mechanism or movements of animals, such as quadruples, e.g., dogs or cats, or so-called humanoid robots, simulating the bodily mechanism or movements of animals erected and walking on feet, such as human being, are already being put to practical use.

As compared to the industrial robots, the above-described robot apparatus are able to execute variable entertainment-oriented operations, and hence are sometimes called entertainment robots. Among these robot apparatus, there are those operating autonomously responsive to the external information or to the inner states of the robot apparatus.

It should be noted that the robot apparatus, performing the autonomous operations, owns the function of recognizing the information of the outer world to reflect the so recognized information on its own behavior. That is, the autonomous robot apparatus changes the feeling model or the instinct model, based on the input information, such as the speech or pictures from outside, or the tactile sense, to decide on its behavior to achieve autonomous thinking and operation control. By the robot apparatus owning the feeling model or the instinct model, the communication between the human being and the robot apparatus may be achieved on a higher intellectual level. It may be surmised that the communication between the human being and the robot apparatus will be smoother if the robot apparatus is the 'humanoid' robot, that is of the same shape or the same structure as the human being.

It may be said that movements closer to those of the human being would be realized with the 'humanoid' robot apparatus if, when the speech is input from the outside environment, the robot apparatus directs itself to the sound source to try to recognize the environment. In particular, from the perspective of improving the friendly relationship with the human being, it is more desirable that, when a person accosts to the robot apparatus, the robot apparatus direct its face to the accosting person.

However, with this 'humanoid' robot apparatus, the possible range of movement of for example the neck or the body trunk portion is limited to improve the impression of the robot apparatus as if it is a living being. That is, if the speech is input from the back side, the robot apparatus is unable to rotate its head in an unlimited fashion. It is therefore desired that the robot apparatus performs a turning movement close to that of the human being.

SUMMARY OF THE INVENTION

It is therefore an object of the present invention to provide a robot apparatus having a sound source direction estimating function and which is capable of turning to the sound source direction by a spontaneous full-body concerted movement, and method for controlling the operation thereof.

For accomplishing the object, the present invention provides a robot apparatus having a body trunk unit, to which are movably connected a head unit and two or more leg units, the robot apparatus executing operations responsive to an action from outside and/or autonomous operations based on an inner state thereof, the robot apparatus comprising rotation means for enabling rotation in at least one of a portion of the body trunk and a neck unit, sound source direction estimating means for estimating the sound source direction, and controlling means for performing control so that, on occurrence of a sound event, the front side of the head unit is directed to the sound source direction through the leg units and/or the rotation means.

With this robot apparatus, if a sound event has occurred, the front side of the head unit is directed to the sound source direction, by a spontaneous full-body concerted movement, through the leg units and/or rotation means.

The present invention also provides a method for controlling the operation of a robot apparatus, having a body trunk unit, to which are movably connected a head unit and two or more leg units, the robot apparatus executing operations responsive to an action from outside and/or autonomous operations based on the inner state thereof, in which the method comprises a sound source direction estimating step of estimating the sound source direction, and a turning step of directing the front side of the head unit to the sound source direction by rotation means which, on occurrence of a sound event, causes rotation in different directions of the body trunk unit and the head unit in the leg units and/or at least one of a portion of said body trunk unit and a neck unit.

With the method for controlling the operation of the robot apparatus, if a sound event has occurred, the front side of the head unit is directed to the sound source direction, by a spontaneous full-body concerted movement, through the leg units and/or rotation means.

That is, the robot apparatus according to the present invention includes a body trunk unit, to which are movably connected a head unit and two or more leg units, the robot apparatus executing operations responsive to an action from outside and/or autonomous operations based on the inner state thereof, in which the robot apparatus comprises rotation means for enabling rotation in at least one of a portion of the body trunk and a neck unit, sound source direction estimating means for estimating the sound source direction, and controlling means for performing control so that, on occurrence of a sound event, the front side of the head unit is directed to the sound source direction through the leg units and/or the rotation means. Thus, if a sound event has occurred, the robot apparatus is able to turn with its front side directed to the sound source direction, through leg units and/or rotating means, by a spontaneous full-body concerted movement.

On the other hand, the operation controlling method for the robot apparatus according to the present invention, having a body trunk unit, to which are movably connected a head unit and two or more leg units, and executing operations responsive to an action from outside and/or autonomous operations based on the inner state thereof, comprises a sound source direction estimating step of estimating the sound source direction, and a turning step of directing the front side of the head unit to the sound source direction by rotation means which, on occurrence of a sound event, causes rotation in different directions of the body trunk unit and the head unit in the leg units and/or at least one of rotating units. Thus, if a sound event has occurred, the front side of the head unit is directed to the sound source direction, by a spontaneous full-body concerted movement, through the leg units and/or rotation means.

BRIEF DESCRIPTION OF THE DRAWINGS

FIG. 15 shows a status transition table provided at each node of the finite probability automaton.

DESCRIPTION OF THE PREFERRED EMBODIMENTS

Figure 1:
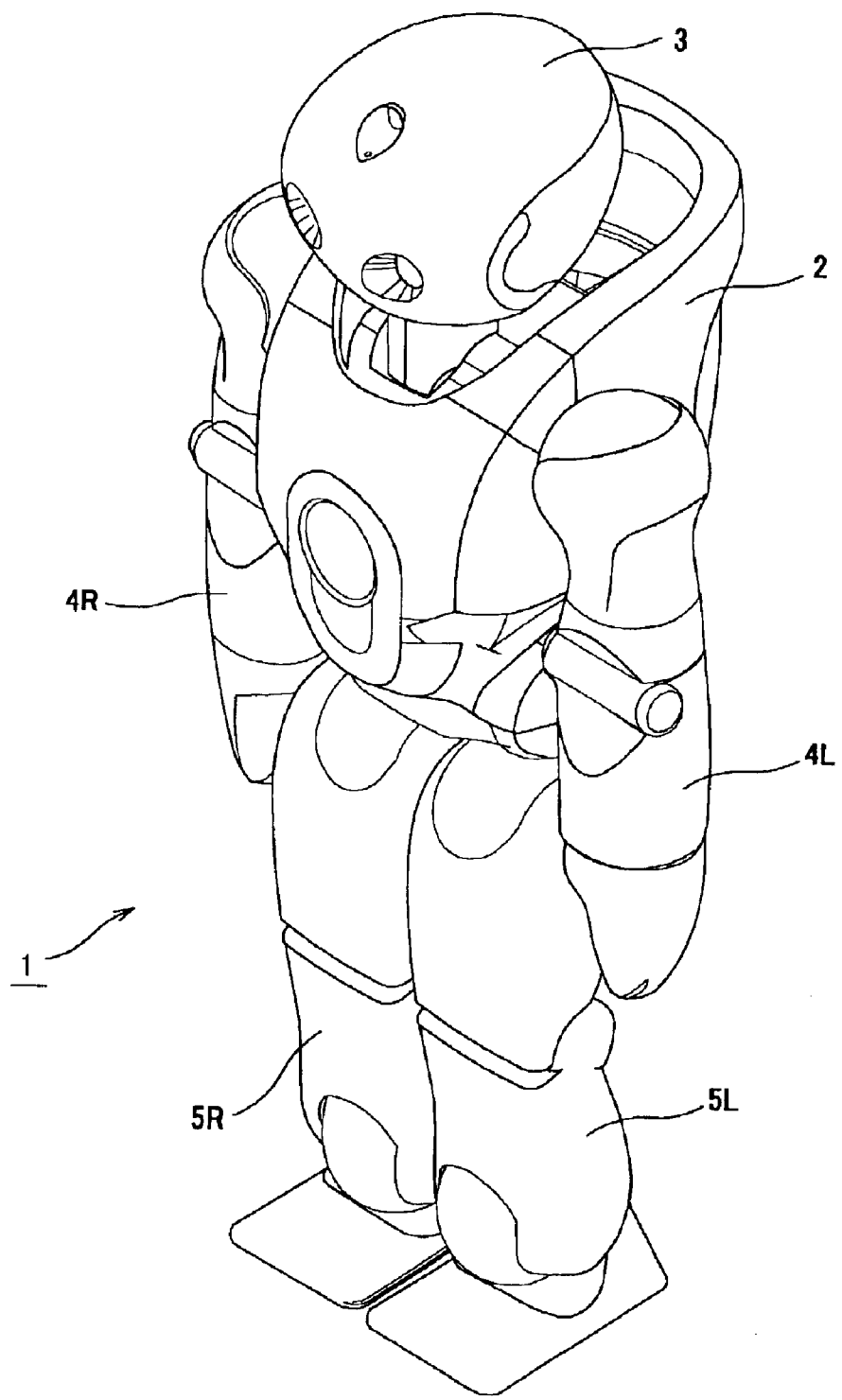
FIG. 1 is a perspective view showing the appearance of a robot apparatus embodying the present invention.

Referring to the drawings, preferred embodiments of the present invention will be explained in detail.

A two-legged walking type robot apparatus, shown as an illustrative structure of the present invention, is a practically useful robot supporting the human activities in various situations in our everyday life, such as in living environment, and, at the same time, is an entertainment robot that is able to act responsive to its inner state, such as anger, sadness, joy or pleasure, as well as to express basic operations performed by the human being.

Referring to FIG. 1, the robot apparatus 1 is made up by a body trunk unit 2, to preset positions of which are connected a head unit 3, left and right arm units 4R/L and left and right leg units 5R/L, where R and L denote suffices indicating left and right, respectively, hereinafter the same.

Figure 2:
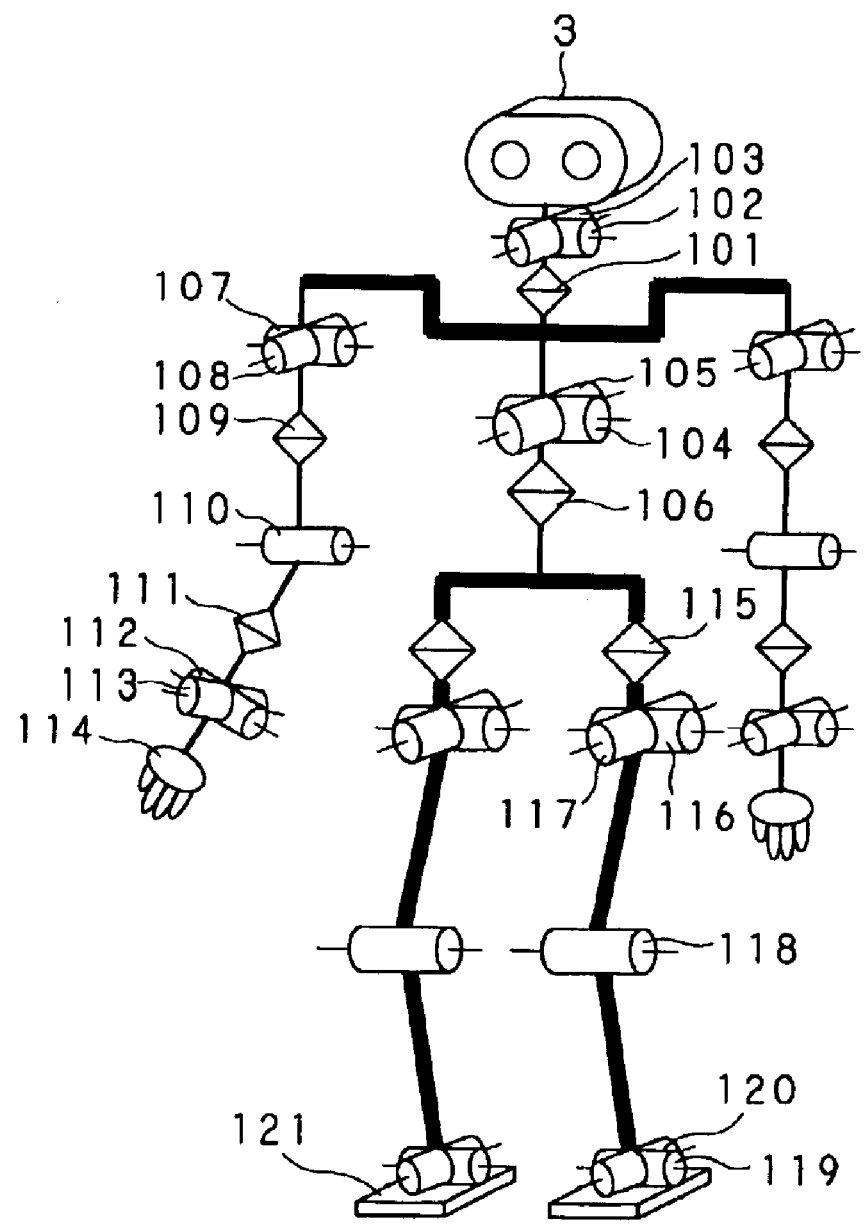
FIG. 2 schematically shows a freedom degree constituting model of the robot apparatus.

FIG. 2 schematically shows the structure of the degree of freedom of joints equipped on the robot apparatus 1. The neck joint, supporting the head unit 3, includes a neck joint yaw axis 101, a neck joint pitch axis 102 and a neck joint roll axis 103 and thus has three degrees of freedom.

The respective arm units 4R/L, constituting the upper limbs, are made up by a shoulder joint pitch axis 107, a shoulder joint roll axis 108, an upper arm yaw axis 109, a hinge joint pitch axis 110, a forearm yaw axis 111, a wrist joint pitch axis 112, a wrist joint roll axis 113 and a hand unit 114. This hand unit 114 is actually a multi-joint multi-degree-of-freedom structure including plural fingers. However, the operation of the hand unit 114 contributes to or influences the orientation or walking control of the robot apparatus 1, only to a lesser extent, and hence the hand unit is assumed in the present specification to be of a zero degree of freedom. Thus, the respective arm units are assumed to have each seven degrees of freedom.

The body trunk unit 2 has three degrees of freedom, namely a body trunk pitch axis 104, a body trunk roll axis 105 and a body trunk yaw axis 106.

The respective leg units 5R/L, constituting the lower limbs, are each made up by a hip joint yaw axis 115, a hip joint pitch axis 116, a hip joint roll axis 117, a knee joint pitch axis 118, an ankle joint pitch axis 119, an ankle joint roll axis 120 and a leg unit 121. In the present specification, the point of intersection between the hip joint pitch axis 116 and the hip joint roll axis 117 defines the hip joint position of the robot apparatus 1. The leg unit 121 of the human body is actually a multi-joint and a multi-degree of-freedom foot sole structure. However, the foot sole of the robot apparatus 1 is assumed to be of a zero degree of freedom. Consequently, each leg has six degrees of freedom.

To summarize, the robot apparatus 1 in its entirety has a sum total of $3+7\times 2+3+6\times 2=32$ degrees of freedom. However, it is to be noted that the number of the degree of freedom of the entertainment-oriented robot apparatus 1 is not necessarily limited to 32, and that the number of the degrees of freedom, that is the number of joints, can be suitably increased or decreased, depending on the designing and production constraints or on the design parameters required of the robot apparatus 1.

The respective degrees of freedom, owned by the robot apparatus 1, are actually implemented by actuators. These actuators are desirably small-sized and lightweight in consideration that there persists a demand for approximating the outer shape of the robot apparatus 1 to the human body by eliminating excess outward protrusion and for achieving orientation control against the unstable structure imposed by two-legged walking. More desirably, the actuator is designed as a small-sized direct gear coupling type AC servo actuator in which a servo control system is arranged as a single chip and loaded in a motor unit.

Figure 3:
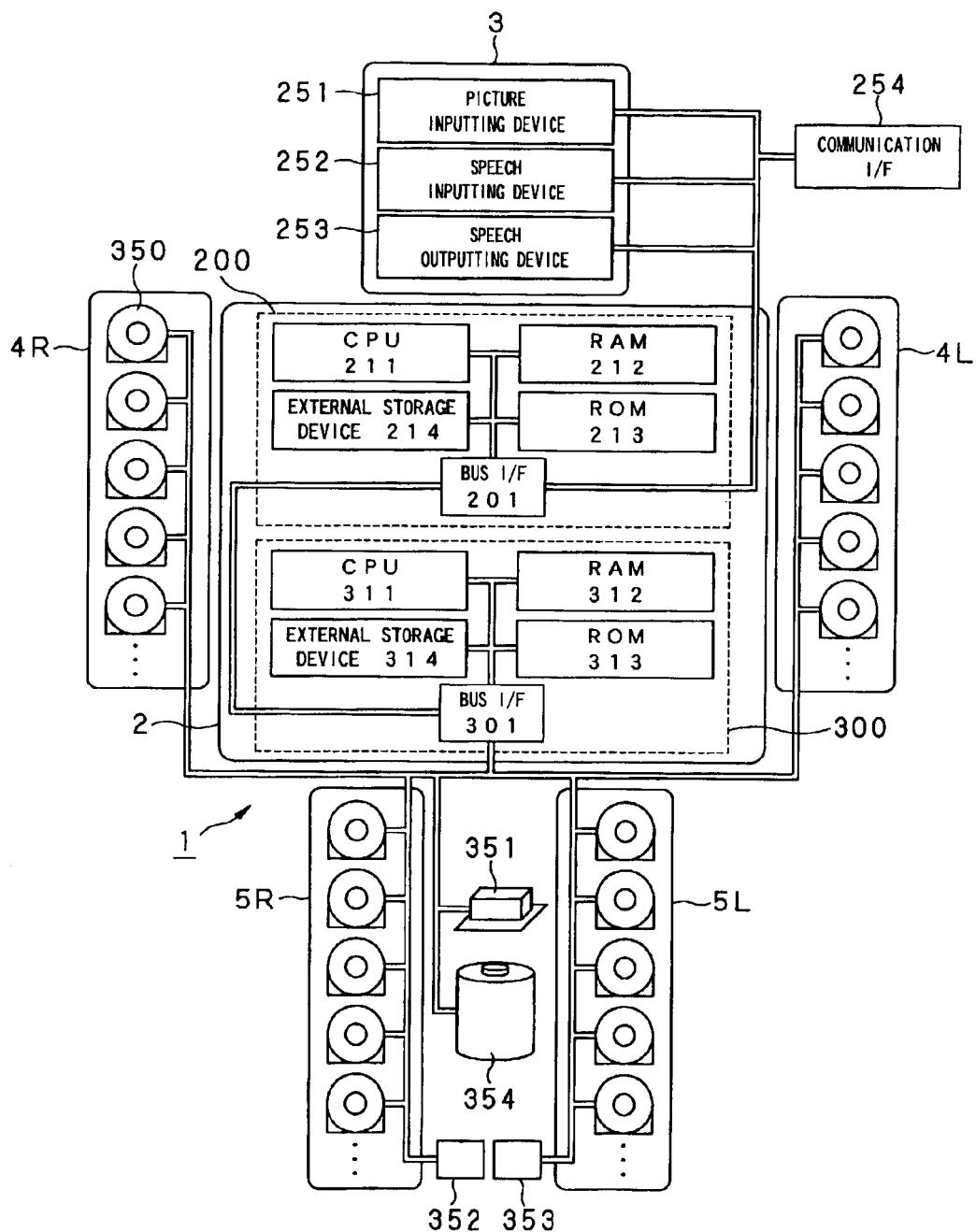
FIG. 3 schematically shows the configuration of a controlling system of the robot apparatus.

FIG. 3 schematically shows a control system structure of the robot apparatus 1. In this figure, the control system is made up by a thinking control module 200, dynamically responsive to e.g., a user input to manage the emotional decision or feeling expression, and a motion control module 300, controlling the concerted whole-body movement of the robot apparatus 1, such as driving an actuator 350.

The thinking control module 200 is an independently driven type information processing apparatus, composed of a CPU (central processing unit) 211, executing calculating processing pertinent to emotional decision and feeling expression, a RAM (random access memory) 212, a ROM (read-only memory) 213, and an external storage device 214 (e.g., a hard disc drive), and which is capable of performing self-completed processing within the module.

The thinking control module 200 determines the current feeling and will of the robot apparatus 1, responsive to stimuli from outside, such as picture data input from a picture inputting device 251 or speech data input from a speech inputting device 252. It is noted that the picture inputting device 251 includes plural CCD (charge-coupled device) cameras, while the speech inputting device 252 includes plural microphones.

The thinking control module 200 issues a command to the movement control module 300 such as to execute operations or behavioral sequence corresponding to the will decided on, that is movement of the four limbs.

The movement control module 300 is an independently driven type information processing apparatus, composed of a CPU 311, controlling the concerted whole-body movements of the robot apparatus 1, a RAM 312, a ROM 313 and an external storage device 314, such as a hard disc drive. This module 300 is capable of performing self-completed processing by itself. In the external storage device 314, there can be stored e.g., a walking pattern, calculated off-line, a targeted ZMP trajectory and other behavioral schedules. Meanwhile, ZMP is a point on a floor surface at which the moment due to reaction from the floor during walking is equal to zero, while the ZMP trajectory means a trajectory along which moves the ZMP during the walking period of the robot apparatus 1. As for the concept of the ZMP and using ZMP as criterion for deciding on the degree of stability of the walking robot, reference is made to Miomir Vukbratovic, "LEGGED LOCOMOTIVE ROBOTS" and Ichiro Kato et al., [Walking Robot and Artificial Leg], published by Nikkan Kogyo Shimbun-Sha.

To the movement control module 300 are connected various devices, such as an actuator 350 for implementing respective degrees of freedom of joints, distributed throughout the whole body of the robot apparatus 1, shown in FIG. 2, an orientation sensor 351 for measuring the orientation or tilt of the body trunk unit 2, floor touch confirming sensors 352, 353 for detecting the floor touching state or floor clear state of the left and right foot soles, and a power supply controlling device 354, managing the power supply, such as a battery, through a bus interface (I/F) 301. The orientation sensor 351 is formed by the combination of for example an acceleration sensor and a gyro sensor, while the floor touch confirming sensors 352, 353 are formed by for example proximity sensors or micro-switches.

The thinking control module 200 and the motion control module 300 are constructed on a common platform and are interconnected over bus interfaces 201 and 301.

The motion control module 300 controls the concerted whole-body movement by the actuators 350, as commanded by the thinking control module 200. That is, the CPU 311 takes out from the external storage device 314 the operational pattern conforming to the action commanded by the thinking control module 200, or internally generates the operational pattern. The CPU 311 sets the foot movement, ZMP movement, body trunk movement, upper limb movement, horizontal waist position and height, in accordance with the specified pattern, while transmitting command values, instructing the operation conforming to the setting contents, to the respective actuators 350.

The CPU 311 detects the orientation or tilt of the body trunk unit 2 of the robot apparatus 1, by an output signal of the orientation sensor 351, while detecting whether the leg units 5R/L are in the flight state or in the stance state, based on the output signals of the floor touch confirming sensors 352, 353, for adaptively controlling the concerted whole-body movement of the robot apparatus 1.

The CPU 311 controls the orientation and movements of the robot apparatus 1, so that the ZMP position will be oriented at all times towards the center of the stable ZMP area.

The motion control module 300 is designed to return the information concerning to which extent the behavior according to the will decided on by the thinking control module 200 has been realized, that is the state of progress of the processing, to the thinking control module 200.

In this manner, the robot apparatus 1 is able to act autonomously, as it decides on its own state and the surrounding state, based on the control program.

Meanwhile, the robot apparatus 1 has the function of estimating the sound source direction, such that it is able to orient itself towards the sound source, thereby recognizing the environment, when the speech is input thereto from for example an external environment. It is noted that the possible range of movement (degree of freedom) of the joints shown in FIG. 2 is limited for further raising the impression of the robot apparatus 1 as if it is a living being. Thus, if the speech is input from outside the possible range of movement of the neck joint yaw axis 101 of FIG. 2, it is necessary for the robot apparatus to rotate the neck and the body trunk in concerted fashion to turn to the sound source direction.

Figure 4A:
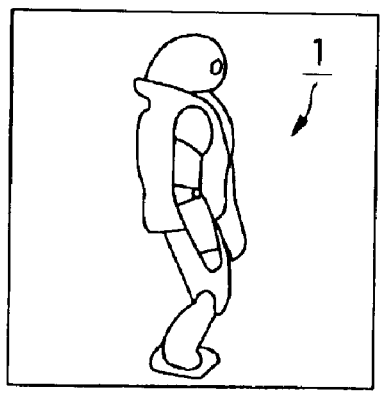
FIG. 4 illustrates the turning movement of the robot apparatus.
Figure 4B:
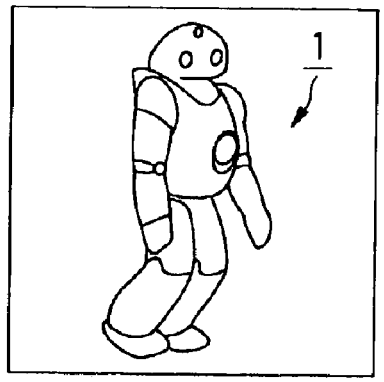
Figure 4C:
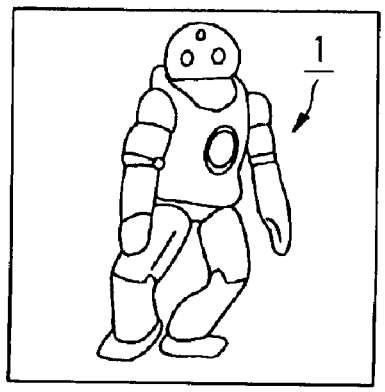
Figure 4D:
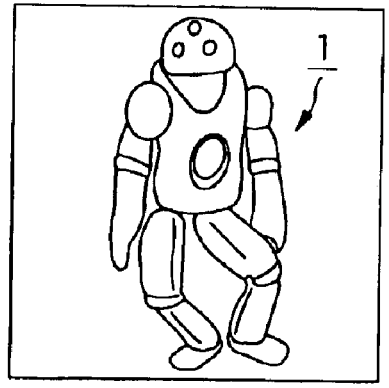
Figure 4E:
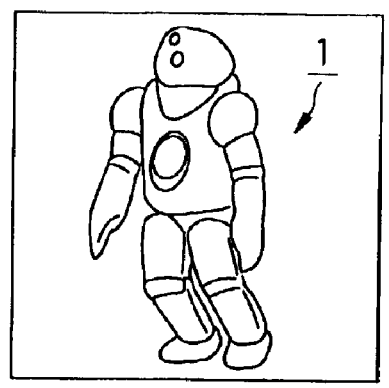
Figure 4F:
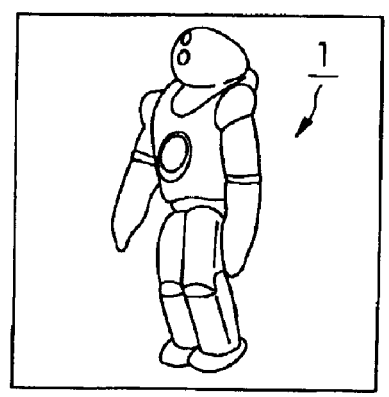

Thus, the robot apparatus 1 of the present embodiment turns to the sound source direction as shown in FIGS. 4A to 4F. That is, if the robot apparatus faces to right as shown in FIG. 4A, and the speech is input from the back side, the robot apparatus rotates its neck, as it rotates its body trunk, using its legs, such as to turn to the sound source direction, as shown in FIGS. 4B to 4F.

Figure 5:
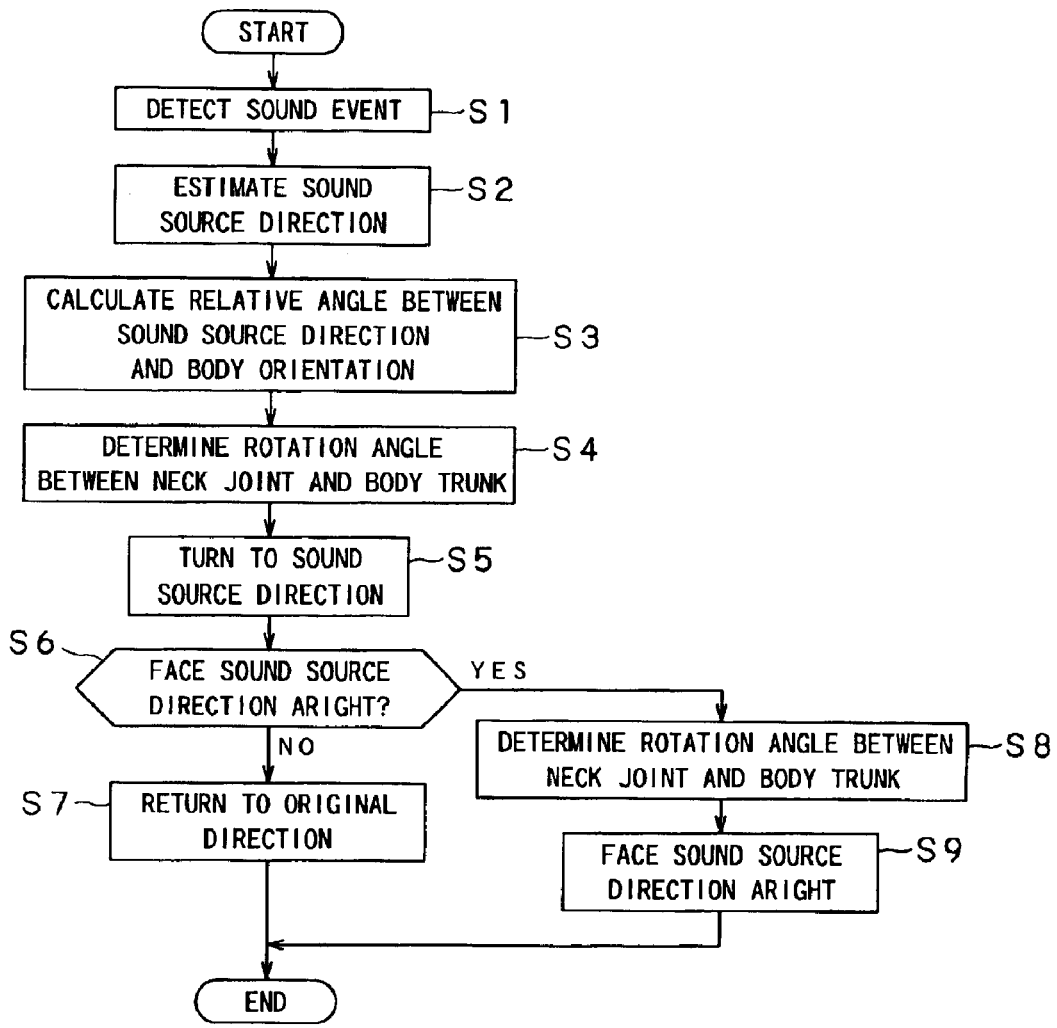
FIG. 5 is a flowchart for illustrating an instance of the turning movement of the robot apparatus.
Figure 6:
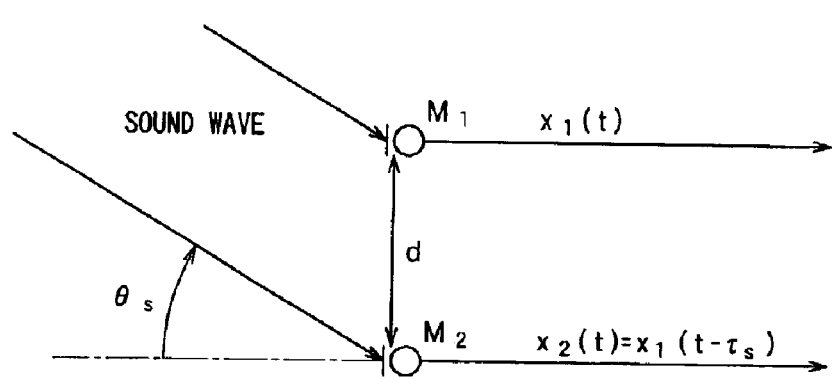
FIG. 6 illustrates the technique of estimating the direction of a sound source.

Referring to the flowchart of FIG. 5, an instance of the turning movement to the sound source direction is now explained. First, in a step S1, the occurrence of a sound event is detected by the sound not less than a preset threshold being input to the microphone of the speech inputting device 252 (FIG. 3).

In the next step S2, the sound source direction of the input sound event is estimated. As mentioned previously, the speech inputting device 252 includes plural microphones, such that the robot apparatus 1 is able to estimate the sound source direction, using these plural microphones. Specifically, the sound source direction may be estimated by exploiting the fact that there persists one-for-one correspondence between the sound source direction and the time difference of signals received by the plural microphones, as stated in for example Ohga, Yamazaki and Kaneda: [Acoustic System and Digital Processing], by Japan Society of Electronic Information Communication, page 197.

That is, if the oncoming planar wave from a $\theta s$ direction is received by two microphones $M_1$ and $M_2$, mounted at a spacing d from each other, the relationship indicated by the following equations (1) and (2) holds between the received sound signal $x_1(t)$ and $x_2(t)$ by the microphones $M_1$, $M_2$:

$$x_2(t) = x_1(t - \tau_s) \quad (1)$$

$$\tau_s = (d \sin \theta s)/c \quad (2)$$

where c is the sound velocity and τs is the time difference of the signals received by the two microphones $M_1$ and $M_2$.

Thus, if the time difference τs between the received sound signals $x_1(t)$ and $x_2(t)$, is found, the oncoming direction of the sound waves, that is the sound source direction, can be found from the following equation (3):

$$\theta s = \sin^{-1}(c\tau s/d) \quad (3).$$

It is noted that the time difference τs may be found from the mutual correlation function $\phi_{12}(\tau)$ between the received sound signals $x_1(t)$ and $x_2(t)$ shown by the following equation (4):

$$\phi_{12}(\tau) = E[x_1(t) \cdot x_2(t+\tau)] \quad (4)$$

where E[·] is an expectation.

From the above equations (1) and (4), the mutual correlation function $\phi_{12}(\tau)$ may be expressed as shown by the following equation (5):

$$\phi_{12}(\tau) = E[x_1(t) \cdot x_1(t+\tau-\tau_s)] = \phi_{11}(\tau - \tau_s) \quad (5)$$

where $\phi_{11}(\tau)$ is the auto-correlation function of the received sound signal $x_1(t)$.

Since the auto-correlation function $\phi_{11}(\tau)$ is known to take on the maximum value for τ=0, it is seen that, from the equation (5), the auto-correlation function $\phi_{12}(\tau)$ takes on the maximum value for $\tau = \tau_s$. Thus, by calculating the auto-correlation function $\phi_{12}(\tau)$ and finding τ which will give the maximum value, τs is obtained, so that, by substituting this $\tau_s$, into the above equation (3), it is possible to find the oncoming direction of the sound waves, that is the sound source direction.

Meanwhile, the above-described technique for estimating the sound source direction is merely illustrative and is not limited to the described example.

Reverting to FIG. 5, the difference between the current direction of the robot apparatus 1 and the sound source direction is calculated in a step S3 to find the relative angle the sound source direction makes with the orientation of the body trunk portion.

In the next step S4, the angle of rotation of the neck joint and the body trunk necessary for rotating the head unit by a relative angle of rotation calculated in the step S3 is determined, taking into account the possible range of movement of the neck joint yaw axis 101 shown in FIG. 2 and the maximum angle of rotation of the body trunk by the leg unit by one rotational operation. It is noted that the angle of rotation only of the neck joint is determined, depending on the sound source direction. In the present embodiment, it is assumed that the body trunk yaw axis 106 is not used, although the robot apparatus 1 has this body trunk yaw axis 106, as shown in FIG. 2. However, it is of course possible for the robot apparatus 1 to turn to the sound source direction, by the concerted whole-body movement, by exploiting the floor touch direction of the neck, waist and the leg.

Figure 7A:
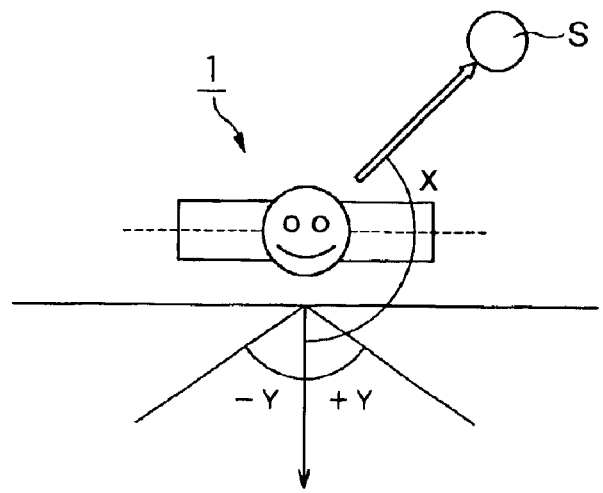
FIGS. 7A to 7C illustrate the turning movement of the robot apparatus, with FIG. 7A showing the state prior to turning, FIG. 7B showing the state after turning and FIG. 7C showing the state of the robot apparatus facing an object aright.

Reference is made specifically to FIG. 7. FIG. 7A shows an instance where the relative angle of the direction of a sound source S to the front side direction of the robot apparatus 1 is X°, with the possible range of movement of the neck of the robot apparatus 1 being ±Y°. If, in this case, the robot apparatus 1 is to turn to the direction of the sound source S, the body trunk in its entirety needs to be rotated through (X−Y)° at the minimum, using the leg unit, while the neck joint yaw axis 101 needs to be rotated Y° to the direction of the sound source S.

In the next step S5, the control information for the respective joints necessary for rotation through the angles derived from step S4 is drafted and executed to cause the robot apparatus 1 to be turned to the sound source direction.

In the next step S6, it is checked whether or not the robot apparatus has to face the sound source direction aright. If it is found in the step S6 that the sound event is mere noise, it is determined to be unnecessary for the robot apparatus to face it aright. Thus, processing transfers to a step S7 to revert the body trunk and the neck to the original orientation to terminate the sequence of operations. If conversely the robot apparatus 1 has found the face of a person the apparatus has learned and memorized, from e.g., the information of the picture inputting device 251 (FIG. 3), and the robot apparatus has determined that it is such person who accosted, processing transfers to a step S8 for the robot apparatus 1 to face the direction aright.

It is noted that the means for detecting the human face may be implemented by a technique disclosed for example in E. Osma, R. Freund and F. Girosi: "Training Support Vector Machines: an Application to Face Detection", CVPR'97, 1997. On the other hand, the means for recognizing the face of a particular person may be implemented by a technique described in for example B. Moghaddam and A. Pentland: "Probabilistic Visual Learning for Object Representation", IEEE Transactions on Pattern analysis and machine Intelligence, Vol.19, No.7, July 1997.

Figure 7B:
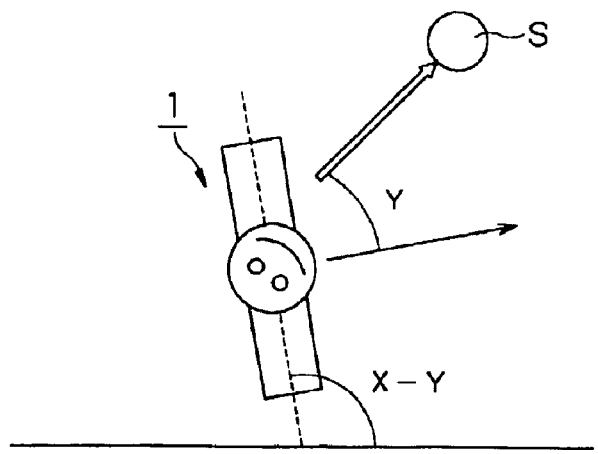
Figure 7C:
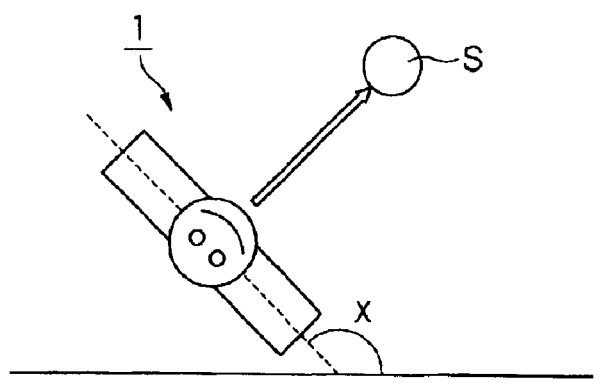

In a step S8, the angles of rotation of the body trunk and the neck, necessary for such facing aright, are calculated. For example, if, in the current orientation of the robot apparatus 1, the neck joint yaw axis 101 has been rotated through Y°, as shown in FIG. 7B, that is if the head unit has been rotated relative to the body trunk through Y°, the body trunk is rotated Y°, at the same time as the neck joint yaw axis 101 is rotated −Y°, as shown in FIG. 7C, whereby the neck distortion may be eliminated as the robot apparatus is gazing at the object, so that the robot apparatus is able to face the direction of the sound source S aright by a spontaneous movement.

Finally, in a step S9, the operation calculated in the step S8 is executed so that the robot apparatus faces the sound source direction aright.

It is possible with the robot apparatus 1 to estimate the sound source direction in this manner to turn to the sound source direction by spontaneous concerted full-body operation.

Depending on the contents of the sound event, the robot apparatus 1 has its neck freed of distortion, as the robot apparatus is gazing at the object, so that the robot apparatus faces the sound source direction aright by a spontaneous operation. If a human being has accosted the robot apparatus, the robot apparatus turns its face to the accosting person aright to improve the intimate relationship with the human being.

Meanwhile, the above operation may be achieved by the motion control module 300 controlling the respective actuators 350 under a command from the thinking control module 200 described above.

Such a situation may arise in which, when the relative angle of the sound source direction to the orientation of the body trunk unit is found and actually the robot apparatus is turned to that direction, the robot apparatus is unable to recognize the object. Specifically, if there is no object in the angle of view of the direction, due to an error in estimating the sound source direction, or the sound source direction is correct but the distance to the object is longer, the object cannot be recognized.

The robot apparatus 1 of the instant embodiment is able to overcome this problem as follows:

An instance of this turning movement is explained with reference to the flowchart of FIG. 8. First, in a step S10, it is detected that the sound event has occurred, by a sound not less than a preset threshold value being input to a microphone of the speech inputting device 251.

In the next step S11, the sound source direction of the input sound event is estimated.

In the next step S12, the difference between the current direction of the robot apparatus and the sound source direction is calculated and the relative angle of the sound source direction to the orientation of the body trunk unit is found.

In the next step S13, the angles of rotation of the neck joint and the body trunk unit, necessary for causing rotation of the head unit by the relative angle calculated in the step S12 are determined, taking into account the possible range of movement of the neck joint yaw axis 101 shown in FIG. 2 or the maximum angle through which the body trunk unit may be rotated by one rotating operation when the body trunk unit is to be rotated using the leg unit. It should be noted that the neck is not to be rotated to the limit of the possible range of movement, but a certain allowance needs to be provided to permit the neck to be swung in the left and right direction after the robot apparatus 1 has made its turning movement.

Figure 9A:
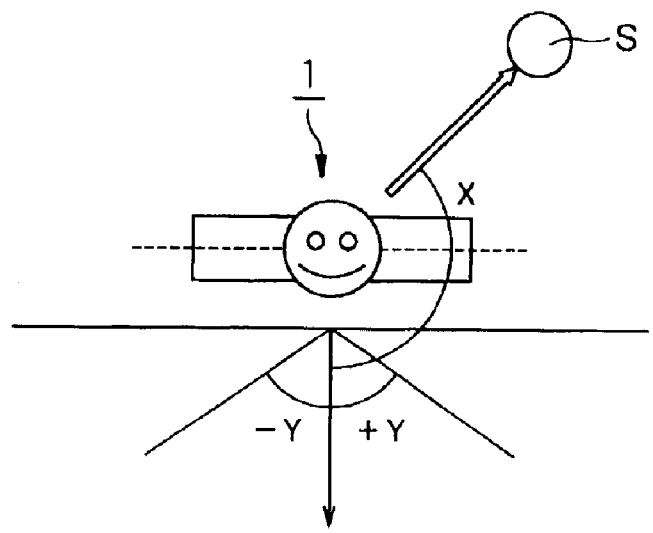
FIGS. 9A and 9B illustrate the turning movement of the robot apparatus, with FIG. 9A showing the state prior to turning and FIG. 9B showing the state after turning.
Figure 9B:
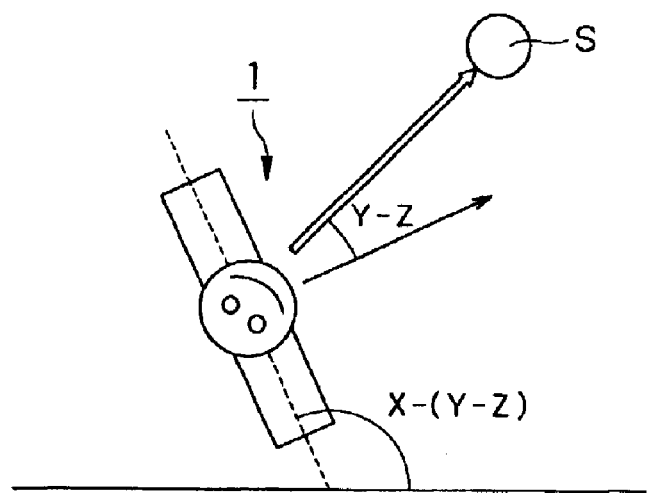

That is, if the possible range of movement of the neck of the robot apparatus 1 is $\pm Y°$ and the relative angle of the direction of the sound source S to the front side direction of the robot apparatus 1 is $X°$, an allowance of $Z°$ is provided, and the body trunk unit in its entirety is rotated by the leg unit by $X-(Y-Z)°$, while the neck joint yaw axis 101 is rotated through $Y-Z°$, as shown in FIG. 9B. This renders it possible for the robot apparatus to turn towards the sound source S and subsequently to swing its neck in the left-and-right direction.

Figure 8:
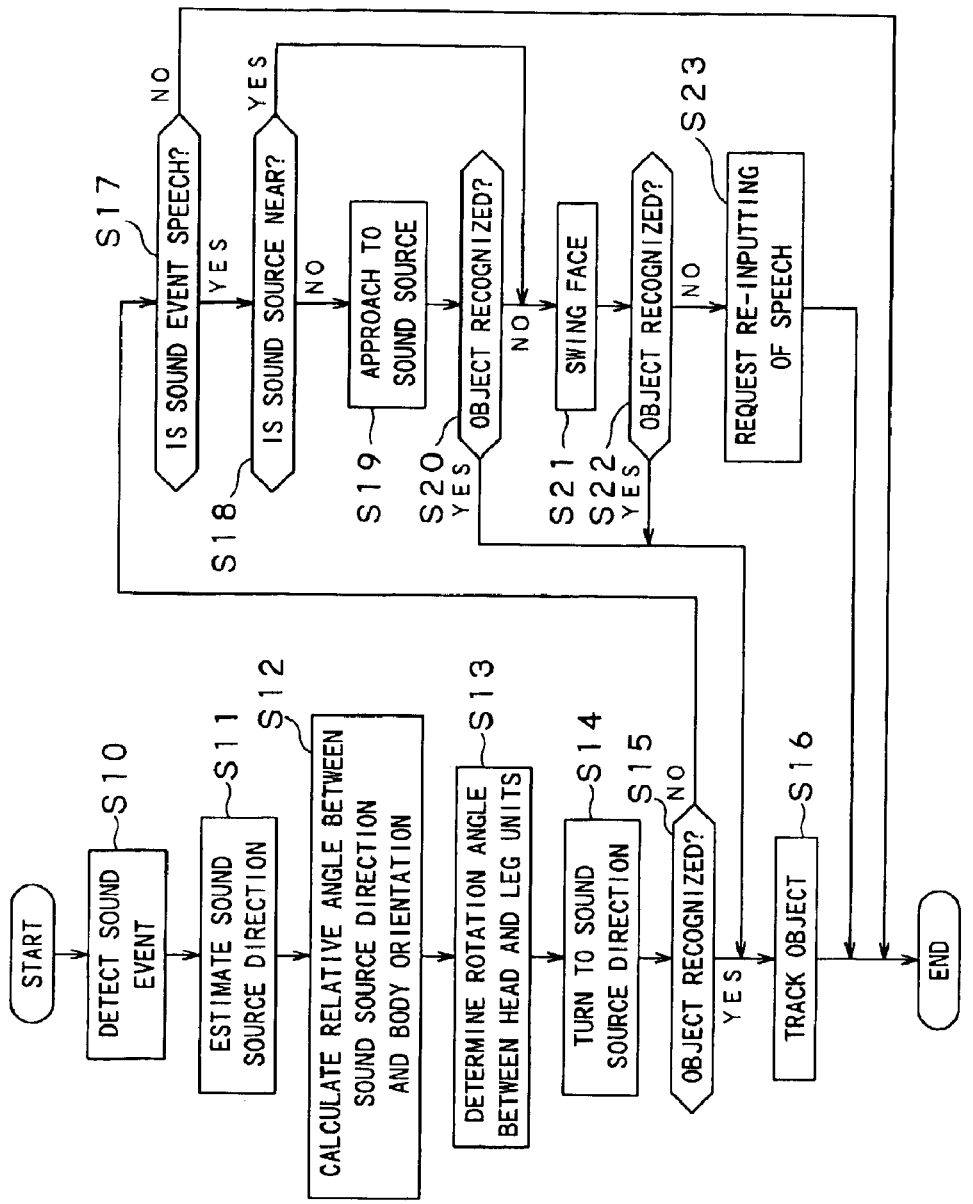
FIG. 8 is a flowchart for illustrating another instance of the turning movement of the robot apparatus.

Reverting to FIG. 8, the control information for the respective joints necessary for rotation through the angles derived from step S13 is drafted and executed in a step S14 to cause the robot apparatus 1 to be turned to the sound source direction.

In a step S15, it is checked whether or not the object could be recognized in the sound source direction. If the robot apparatus 1 has found in the step S15 the face of a person the apparatus has learned and memorized, processing transfers to a step S16, under the assumption that the object could be found in the sound source direction.

In a step S16, the recognized object is set as a tracking object. The orientation of the neck or the body trunk is then changed, in keeping with the object movement, to track the object to complete the sequence of operations.

If, in the step S15, the object could not be recognized, processing transfers to a step S17, where it is verified whether or not the sound event was the speech. Such decision as to whether or not the sound event was the speech may be given by statistically modeling the speech and the non-speech by for example the HMM (Hidden Markov method) and by comparing the likelihood values. If it was verified in the step S17 that the sound was not the speech, the sound event is determined to be that derived from a phenomenon that does not have to be recognized, such as the door closing sound or noise, and the sequence of operations is then terminated. If the sound event is determined to be the speech in the step S17, processing transfers to a step S18.

In the step S18, it is verified whether or not the sound source is at a near-by position. This distance may be roughly estimated by calculating the estimated distance to the sound source by calculating the estimated distance to the sound source by a technique disclosed in for example a reference material: F. Asano, H. Asoh and T. Matsui, "Sound Source Localization and Separation in Near Field", IEICE Trans. Fundamental, vol.E83-A, No.11, 2000. If, in the step S18, the distance to the sound source is so far that, with the performance of the picture inputting device 251 or the object recognition means in use, the object can hardly be recognized, the robot apparatus 1 itself is caused to walk in the sound source direction, in the next step S19, to a distance that permits of recognition of the object to assure the object recognition accuracy. If, in the step S18, the distance to the sound source is near, processing transfers to a step S21 without the robot apparatus having to walk in this manner.

In a step S20, it is again verified whether or not the object is recognizable. If the object could be recognized in the step S20, processing reverts to the step S16 to transfer to tracking processing to terminate the sequence of operations. If the object could not be recognized in the step S20, processing transfers to the step S21.

In the step S21, the estimation of the sound source direction is assumed to be in error and accordingly the head unit is swung in the up-and-down direction and in the left-and-right direction by causing rotation of the neck joint pitch axis 102 and the neck joint yaw axis 101.

In the next step S22, it is checked whether or not the object could be recognized by swinging the head unit in the up-and-down direction and in the left-and-right direction. If the object could be recognized in the step S22, processing reverts to the step S16 to transfer to tracking processing to terminate the sequence of operations. If the object could not be recognized in the step S22, the estimation of the sound source direction may be assumed to be in error significantly, and hence that purport is output at a step S23 to terminate the sequence of operations. Specifically, should the object be a human operator, such speech as "I can't see where you are. Would you speak once more?" may be output to ask the operator to re-input his/her speech to re-execute the sequence of operations.

In this manner, if, due to the estimation error of the sound source direction, there is no object in the field of view for the direction to which the robot apparatus has turned, or if the sound source direction is correct but the distance to the object is far, the object can be recognized by the robot apparatus 1 approaching to the sound source or swinging its face in the left-and-right direction. In particular, since the neck rotation angle is set such that the head unit can be swung further in the left-and-right direction after the robot apparatus has turned to the sound source direction, the object can be tracked by a spontaneous movement.

In the foregoing explanation, the distance to the sound source is estimated and the face swinging movement is caused to occur after the robot apparatus has approached to the sound source. The present invention is, however, not limited to this configuration. For example, if the accuracy in the estimation of the distance to the sound source object is appreciably lower than the accuracy in the estimation of the sound source direction, the face swinging movement may be caused to occur before the robot apparatus approaches to the sound source.

In the above-described embodiment, the robot apparatus 1 itself is caused to walk to a distance that permits of recognition of the object, after which it is again checked whether or not the object can be recognized at such position. This, however, is not limitative of the present invention. For example, the robot apparatus may be caused to approach in the sound source direction a preset distance, such as 50 cm, to make a check again as to whether or not the object can be recognized at this position.

Additionally, the means used for recognizing the object in the above-described embodiment is face detection or face recognition. This, again, is not limitative such that it may be the particular color or shape that is recognized.

Meanwhile, the robot apparatus 1 is able to take autonomous behaviors responsive to its inner state. Referring to FIGS. 10 to 15, an illustrative structure of the software of a control program in the robot apparatus 1 is now explained.

Figure 10:
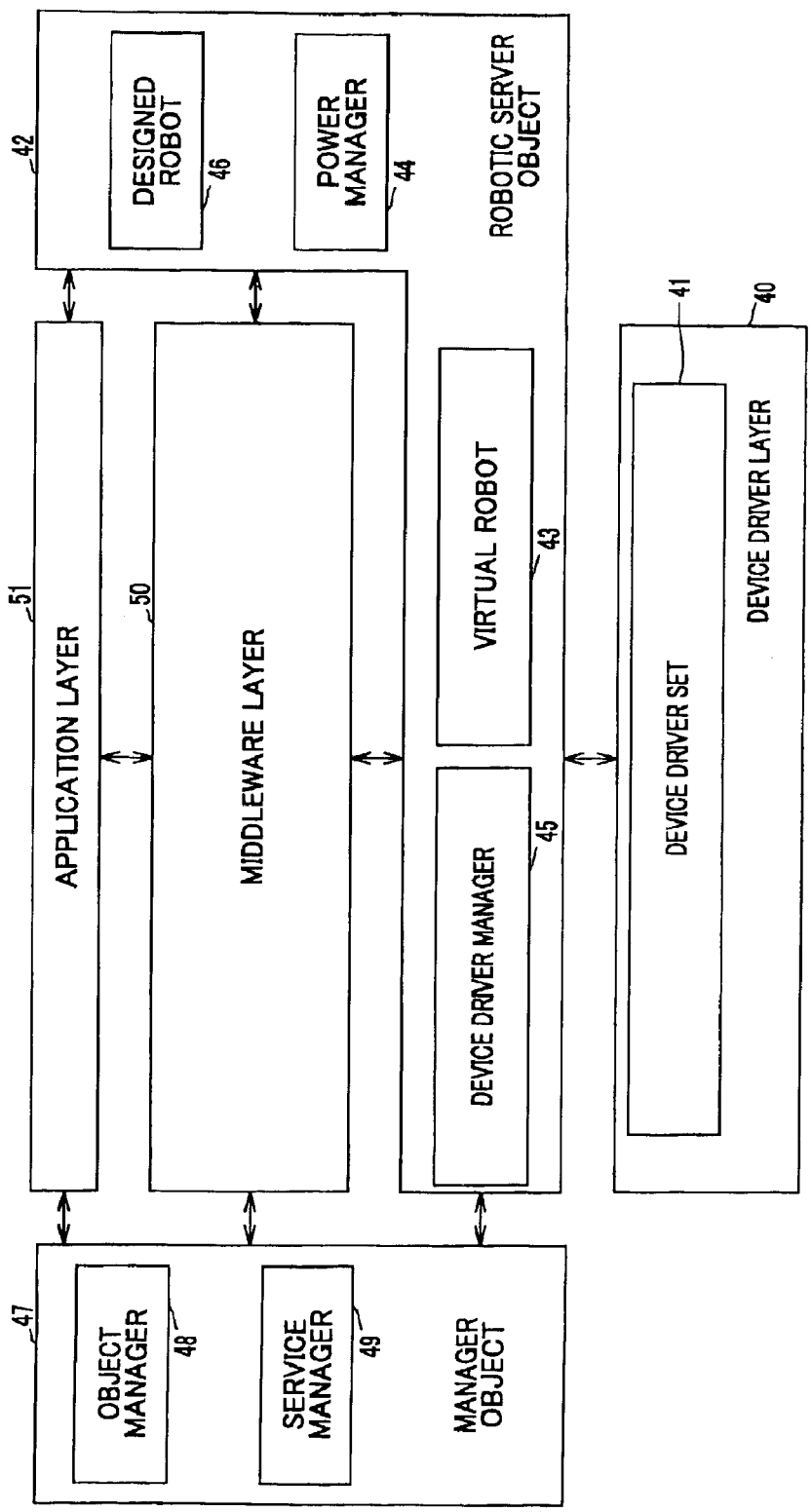
FIG. 10 is a block diagram showing the software configuration of the robot apparatus.

Referring to FIG. 10, a device driver layer 40 is the lowermost layer of the control program, and is made up by a device driver set 41 comprised of plural device drivers. Each device driver is an object allowed to have direct access to the hardware used in an ordinary computer, such as a CCD camera or a timer, and which performs processing responsive to interrupt from the associated with hardware.

A robotic server object 42 is a lowermost layer of the device driver layer 40, and is made up by a virtual robot 43, composed of a set of softwares for accessing hardware units, such as aforementioned various sensors or the actuator 350, a power manager 44, made up by a set of softwares, supervising the power supply switching, a device driver manager 45, made up by a set of softwares for supervising the other various device drivers, and a designed robot 46, made up by a set of softwares, supervising the mechanism of the robot apparatus 1.

A manager object 47 is made up by an object manager 48 and a service manager 49. The object manager 48 is a set of softwares supervising the booting or end of operation of the softwares included in the robotic server object 42, middleware layer 50 and an application layer 51, while the service manager 49 is a set of softwares supervising the interconnection among the respective objects based on the connection information among the respective objects stated in a connection file stored in the memory card.

The middleware layer 50 is an upper layer of the robotic server object 42 and is made up by a set of softwares providing the basic functions of the robot apparatus 1, such as picture or speech processing. The application layer 51, on the other hand, is an upper layer of the middleware layer 50 and is made up by a set of softwares determining the behavior of the robot apparatus 1 based on the results of processing by the respective softwares making up the middleware layer 50.

Figure 11:
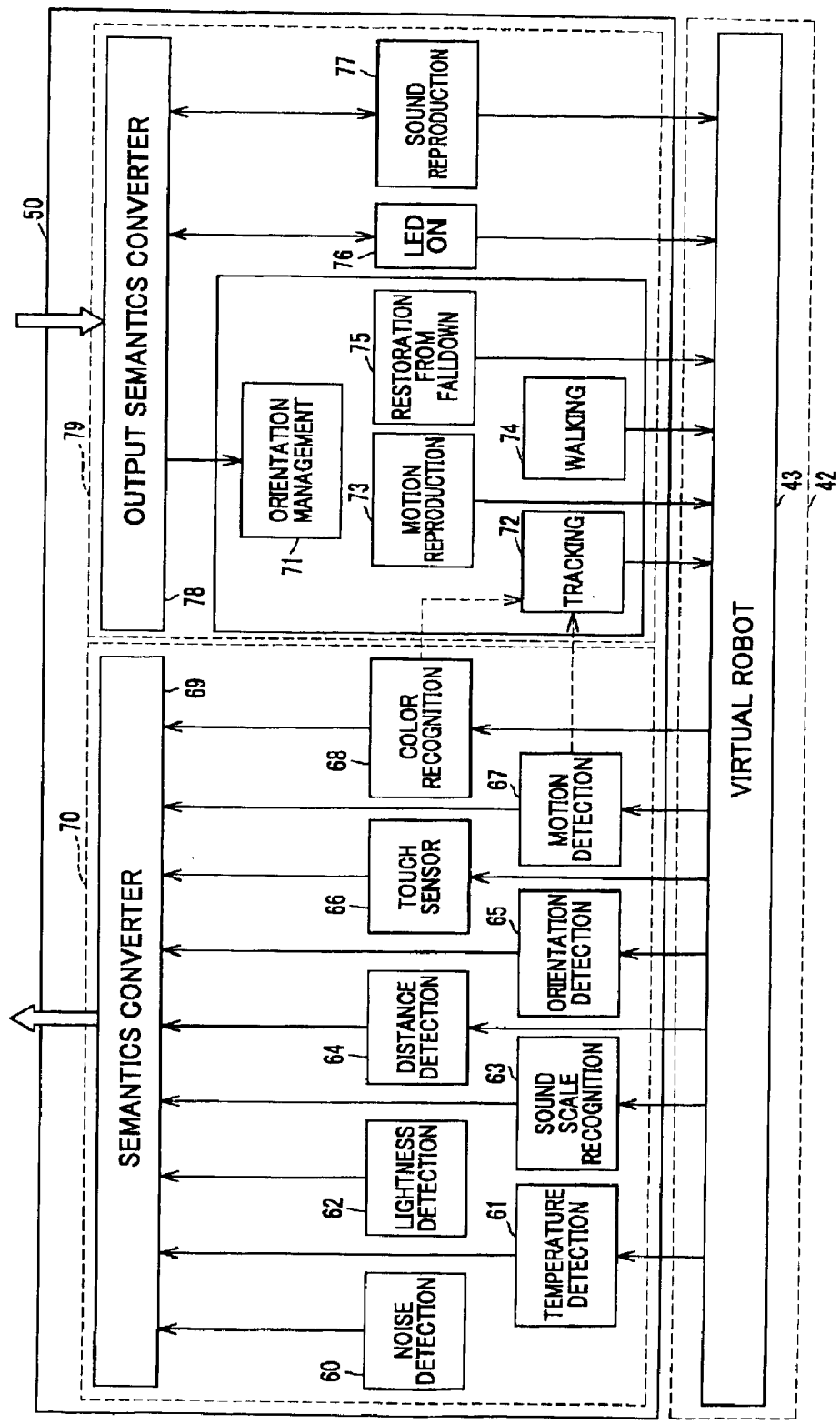
FIG. 11 is a block diagram showing the configuration of a middleware layer in the software configuration of the robot apparatus.

FIG. 11 shows a specified middleware structures of the middleware layer 50 and the application layer 51.

Referring to FIG. 11, the middleware layer 50 is made up by a recognition system 70 and an output system 79. The recognition system 70 includes signal processing modules 60 to 68 for detecting the noise, temperature, lightness, sound scales, distance and the orientation, as a touch sensor, and for detecting the motion and the color, and an input semantics converter module 69, while the output system 79 includes an output semantics converter module 78 and signal processing modules 71 to 77 for orientation management, for tracking, motion reproduction, walking, restoration from falldown, LED lighting an for sound reproduction.

The respective signal processing modules 60 to 68 of the recognition system 70 take in relevant ones of the sensor data, picture data and the speech data, read out from the DRAM by the virtual robot 43 of the robotic server object 42 and perform preset processing on the so taken-in data to send the processed result to the input semantics converter module 69. For example, the virtual robot 43 is designed as a component responsible for transmitting/receiving or converting signals, under a preset communication protocol.

Based on the processed results, applied from these signal processing modules, the input semantics converter module 69 recognizes its own state, surrounding state, command from the user or the behavior by the user, such as [chill!], [sultry], [light], [a ball detected], [a falldown detected], [stroked], [patted], [the sound scales of do, mi and so on heard], [a moving object detected], or [an obstacle detected], and outputs the recognized results to the application layer 51.

Figure 12:
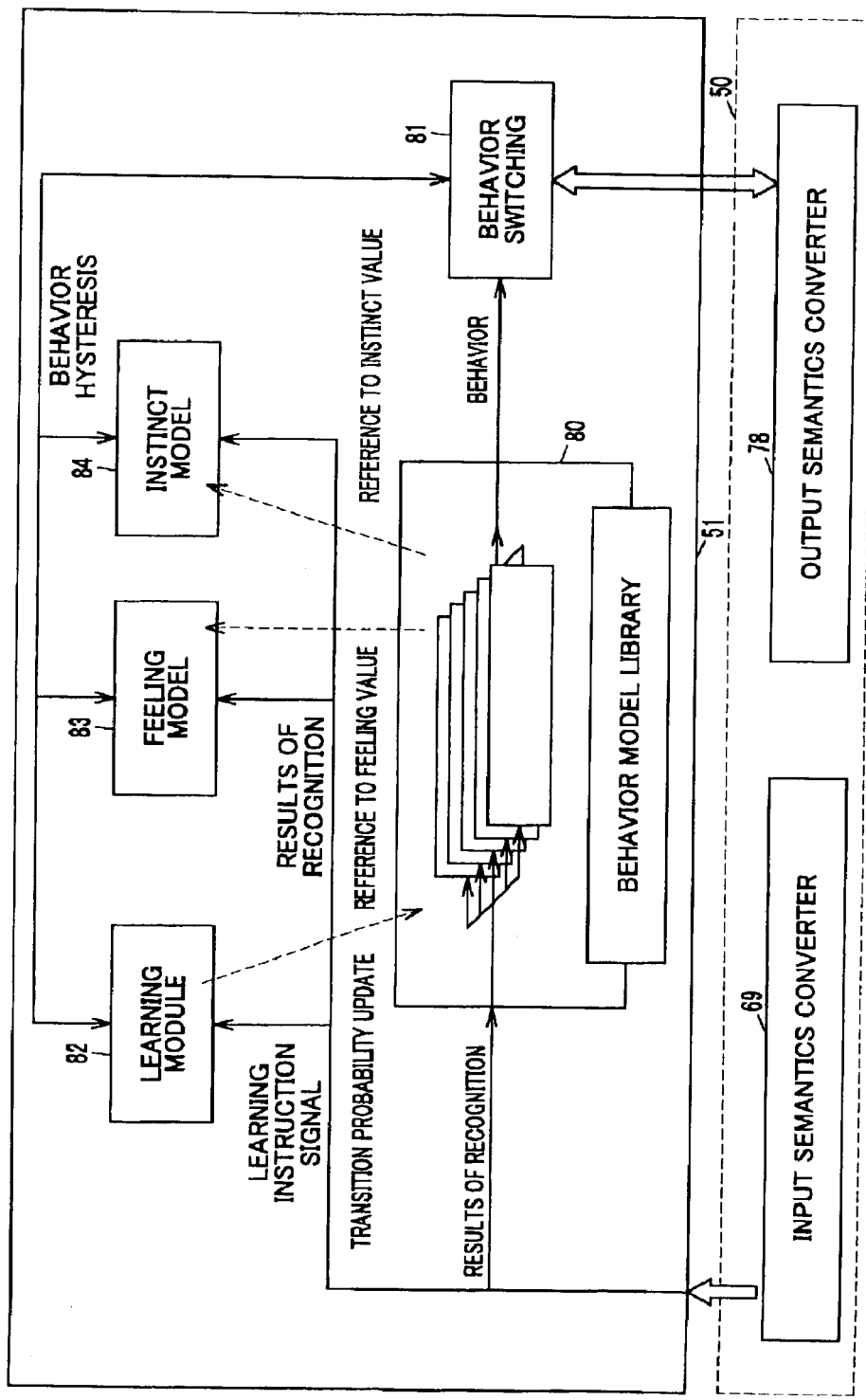
FIG. 12 is a block diagram showing the configuration of an application layer in the software configuration of the robot apparatus.

Referring to FIG. 12, the application layer 51 is made up by five modules, namely a behavior model library 80, an behavior switching module 81, a learning module 82, a feeling model 83 and an instinct model 84.

Figure 13:
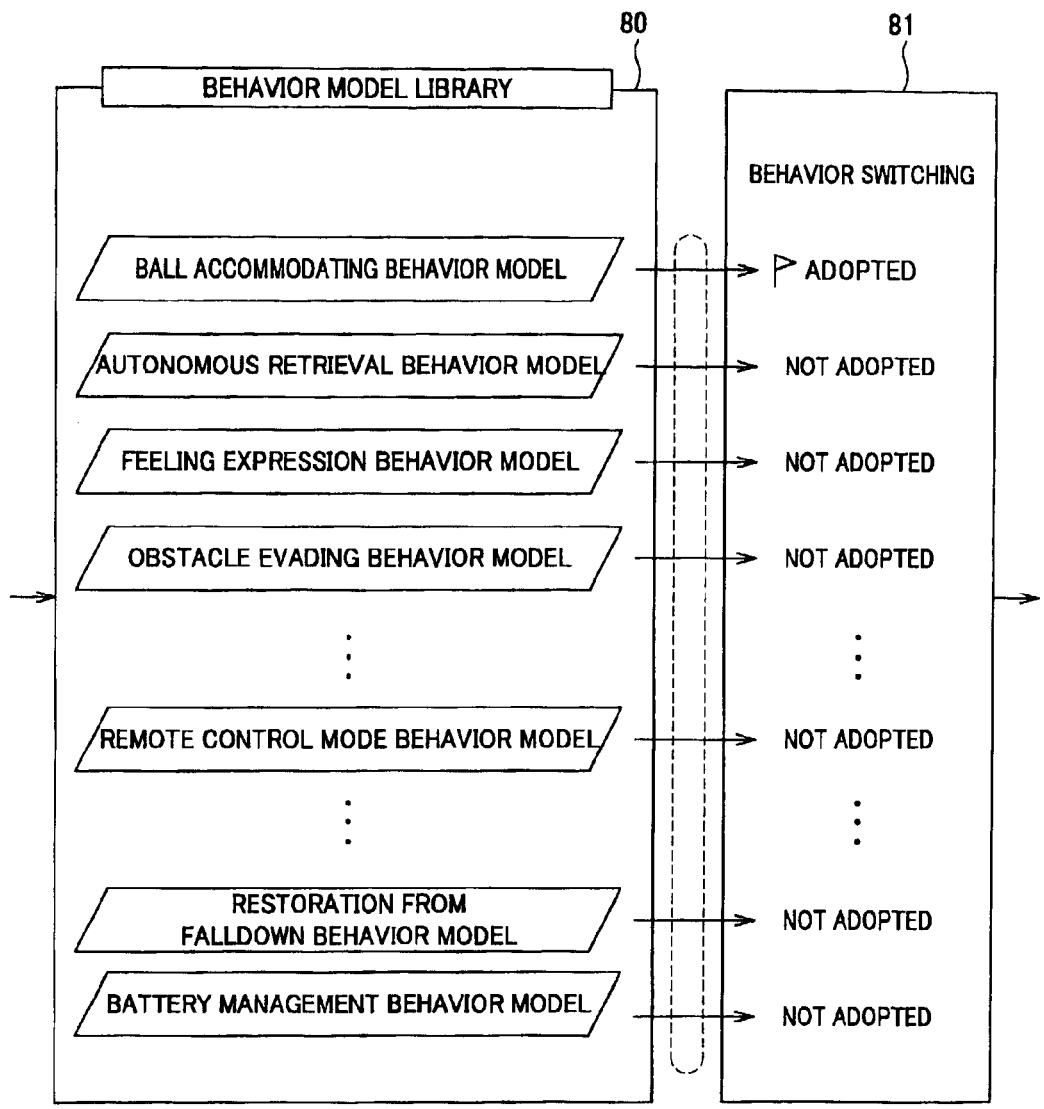
FIG. 13 is a block diagram showing the configuration of a behavioral model library of the application layer.

In the behavior model library 80, there are provided, as shown in FIG. 13, independent behavior models in association with several pre-selected conditional items, such as [case where residual battery capacity is diminished], [restoration from the falldown state], [case where an obstacle is to be avoided], [case where a feeling is to be expressed], [case where a ball has been detected].

When the results of the recognition are given from the input semantics converter module 69 or when a preset time has elapsed from the time the last result of recognition was given, the above behavior models decide on the next behaviors to be taken, as reference is had to parameter values of the associated emotions stored in the feeling model 83 or to parameter values of the associated desires held in the instinct model 84 to output the determined results to the behavior switching module 81.

Figure 14:
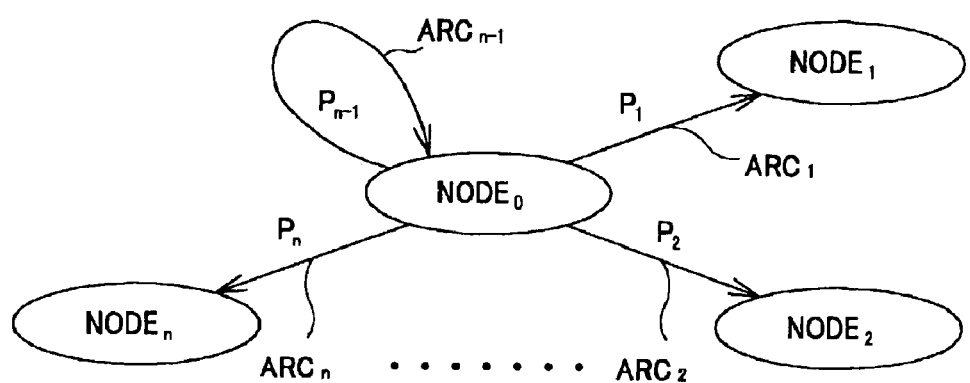
FIG. 14 illustrates a finite probability automaton as the information for determining the behavior of the robot apparatus.

In the present embodiment, the respective behavior models use an algorithm, termed finite probability automaton, as a technique for determining the next behaviors, as shown in FIG. 14. This algorithm is such a one in which the next one of the other nodes $NODE_0$ to $NODE_n$, to which transfer is to be made from one of the nodes $NODE_0$ to $NODE_n$ is probabilistically determined based on the transition probability values $P_1$, to $P_n$ as set for each of the arcs $ARC_1$, to $ARC_{n-1}$ interconnecting the respective nodes $NODE_0$ to $NODE_n$.

Specifically, the respective behavior models each include a status transition table 90, forming its own behavior model, for each of the nodes $NODE_0$ to $NODE_n$, each in association with the nodes $NODE_0$ to $NODE_n$, as shown in FIG. 15.

In this status transition table 90, input events (results of the recognition), representing the conditions of transition in the node of $NODE_0$ to $NODE_2$, are entered in the column of the [input event names] in the order of the falling priority, and further conditions for the transition conditions are entered in the relevant rows of columns of the [data names] and [data ranges].

Thus, in the node $NODE_{100}$, represented in the status transition table 90 of FIG. 15, given the results of the recognition of [ball detected], the ball [size] being in a range [from 0 to 1000], which is afforded along with the results of the recognition, represents the condition for transition to the other node. In similar manner, given the results of the recognition of [obstacle detected], the [distance] to the obstacle, afforded along with the results of the recognition, being in a range [from 0 to 100], represents the condition for transition to the other node.

Moreover, if, in this node $NODE_{100}$, there is no input of the results of recognition, but any of the values of the parameters [joy], [surprise] and [sadness], held by the feeling model 83, among the parameters of the emotions and desires, held by the feeling model 83 and the instinct model 84, periodically referenced by the behavior models, is in a range from [50 to 100], transition may be made to the other node.

In the status transition table 90, the names of the nodes, to which transition may be made from the nodes $NODE_0$–node $NODE_n$, are entered in the row [mode of destination of transition] in the column [transition probability to the other nodes], while the transition probabilities to the other node of the node $NODE_0$–$NODE_n$, to which transition may be made when all the conditions entered in the columns of the [input event names], [data names] and [data ranges] are met, are entered in the relevant cells of the column [transition probability to the other nodes]. Also entered in the row [output behavior] in the column [transition probability to the other nodes] are the behaviors to be output in making transition to the other of the nodes $NODE_0$–$NODE_n$. Meanwhile, the sum of the probabilities of the respective rows in the column [transition probability to the other nodes] is 100%.

Thus, in the node $NODE_{100}$, indicated in the status transition table 90 of FIG. 15, if the results of the recognition are such that the [ball is detected] and the [size] of the ball is in a range from [0 to 1000], transition may be made to the [node $NODE_{120}$] at a probability of [30%] and the behavior [ACTION 1] is taken at this time,.

Each behavior model is constructed that a number of the nodes $NODE_0$ to the node $NODE_n$, stated in the status transition table 90, are concatenated, such that, when the results of the recognition are afforded from the input semantics converter module 69, the next behavior is determined probabilistically by exploiting the status transition table of the corresponding nodes $NODE_0$ to $NODE_n$, with the results of the decision being output to the behavior switching module 81.

The behavior switching module 81, shown in FIG. 9, selects the output behavior from the behaviors output from the behavior models of the behavior model library 80 so that the behavior selected is one output from the predetermined behavior model with the highest rank in the priority order. The behavior switching module 81 sends a command for executing the behavior, referred to below as the behavior command, to an output semantics converter module 78 of the middleware layer 50. Meanwhile, in the present embodiment, the behavior models shown in FIG. 10 becomes higher in the descending direction in the drawing.

Based on the behavior completion information, afforded from the output semantics converter module 78 after the end of the behavior, the behavior switching module 81 informs the learning module 82, feeling model 83 and the instinct model 84 of the end of the behavior.

The learning module 82 inputs the results of the recognition of the instructions, received as the action from the user, such as [patting] or [stroking], among the results of the recognition afforded from the input semantics converter module 69.

Based on the results of the recognition and on the notice from the behavior switching module 71, the learning module 82 changes the corresponding transition probability of the corresponding behavior model in the behavior model library 70 for lowering and raising the probability of occurrence of the behavior in case of patting (scolding) and stroking (praising), respectively.

On the other hand, the feeling model 83 holds parameters indicating the intensity of each of six emotions of [joy], [sadness], [anger], [surprise], [disgust] and [fear]. The feeling model 83 periodically updates the parameter values of these emotions based on the specified results of the recognition afforded by the input semantics converter module 69, such as [patting] or [stroking], time elapsed and on notices from the behavior switching module.

Specifically, the feeling model 83 calculates, based on the results of the recognition supplied from the input semantics converter module 69, the behavior of the robot apparatus 1 at this time and on the time elapsed since the previous update operation, a parameter value E[t+1] of a given emotion in the next period by the equation (1):

$$E(t+1)=E[t]+k_e \times \Delta E(t) \tag{1}$$

where $\Delta E(t)$ is the variation of the emotion as calculated by a preset equation for calculation, E[t] is the current parameter value of the emotion, and $k_e$ is the coefficient representing the sensitivity of the emotion, and substitutes the parameter value E[t+1] for the current parameter value of the emotion E[t] to update the parameter value of the emotion. The feeling model 83 also updates the parameter values of the totality of the emotions in similar manner.

Meanwhile, to which extent the results of the recognition or the notice from the output semantics converter module 78 affect the amount of the variation $\Delta E[t]$ of the parameter values of the respective emotions is predetermined, such that the results of the recognition [being patted] seriously affect the amount of the variation $\Delta E[t]$ of the parameter value of the emotion [anger], while the results of the recognition [being stroked] seriously affect the amount of the variation $\Delta E[t]$ of the parameter value of the emotion [joy].

It is noted that the notice from the output semantics converter module 78 is the what may be said to be the feedback information of the behavior (behavior end information), that is the information concerning the results of the occurrence of the behavior, and that the feeling model 83 changes its emotion by this information. For example, the behavior of [shouting] lowers the feeling level of anger. Meanwhile, the notice from the output semantics converter module 78 is also input to the learning module 82 such that the learning module 82 changes the corresponding transition probability of the behavior model based on such notice.

Meanwhile, the feedback of the results of the behavior may be made by the output of the behavior switching module 81 (behavior added by the feeling).

The instinct model 84 holds parameters, indicating the strength of four independent desires, namely desire for exercise, desire for affection, appetite and curiosity. Based on the results of the recognition afforded by the input semantics converter module 69, time elapsed and on the notice from the behavior switching module 81, the instinct model 84 periodically updates the parameters of these desires.

Specifically, the instinct model 84 updates, for the desire for exercise, desire for affection and curiosity, based on the results of the recognition, time elapsed and on the notice from the output semantics converter module 78, the parameter value of the desire in question by calculating, at a preset period, a parameter value for the desire in question I[k+1] for the next period, using the following equation (2):

$$I[k+1]=I[k]+k_i \times \Delta I[k] \tag{2}:$$

where $\Delta I[k]$ is the amount of the variation of the desire as calculated by a preset equation for calculation, I[k] is the current parameter value of the desire in question and $k_i$ is the coefficient expressing the sensitivity of the desire in question and by substituting the results of the calculation for the current parameter values I[k] of the desire in question. In similar manner, the instinct model 84 updates the parameter values of the respective desires different than the [appetite].

Meanwhile, to which extent the results of the recognition and the notice from the output semantics converter module 78 affect the amount of the variation ΔI[k] of the parameter values of the respective desires is predetermined, such that the results of the recognition [fatigue] seriously affects the amount of the variation ΔI[k] of the parameter value of the [joy].

In the present embodiment, the parameter values of the respective emotions and desires (instincts) are controlled to be varied in a range from 0 to 100, while the values of the coefficients $k_e$ and $k_i$ are set from one emotion to another and from one desire to another.

On the other hand, the output semantics converter module 78 of the middleware layer 50 gives abstract behavioral commands afforded by the behavior switching module 81 of the application layer 51, such as [advance], [joy], [speak] or [tracking (track a ball)], to the signal processing modules 71 to 77 of the output system 79, as shown in FIG. 11.

If a behavioral command is issued, the signal processing modules 71 to 77 generates servo command values to be supplied to the associated actuator for performing the behavior, speech data of the sound output from the loudspeaker or the driving data to be supplied to the LED, to route these values or data to the associated actuator, loudspeaker or to the LED, through the virtual robot 43 of the robotic server object 42 and the relevant signal processing circuitry.

In this manner, the robot apparatus 1 is able to perform autonomous behavior, responsive to its own inner status, surrounding (external) status and commands or actions from the user, based on the aforementioned control program.

This control program is supplied through a recording medium recorded in a robot apparatus readable form. The recording medium for recording the control program may be exemplified by magnetically readable recording mediums, such as magnetic tapes, flexible discs or magnetic cards, and optically readable recording mediums, such as CD-ROMs, MOs, CD-R or DVD. The recording medium may also be exemplified by semiconductor memories, such as memory cards of rectangular, square-shaped or the like shape. The control program may also be afforded over e.g., the Internet.

These control programs are reproduced via dedicated read-in drivers or personal computers, or transmitted over cable or wireless connection so as to be read-in by the robot apparatus 1. If equipped with a driving device for a small-sized recording medium, such as IC card, the robot apparatus 1 is also able to read-in the control program directly from the recording medium.

With the present robot apparatus 1, autonomous thinking and operation control may be realized by changing the feeling model 83 (FIG. 12) or the instinct model 84 based on the input information, such as speech, picture or tactile sense to determine the operation. For example, if the speech is input from an external environment, the robot apparatus 1 may turn to the sound source direction to face the object aright or to track the object.

The present invention has been disclosed in the perspective of illustration and hence a large variety of modifications may be made without departing its scope.

While the invention has been described in accordance with certain present embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and the spirit of the present invention as set forth and defined in the appended claims.

What is claimed is:

1. A robot apparatus having a body trunk unit, to which are movably connected a head unit and two or more leg units, the robot apparatus executing operations responsive to an action from outside and/or autonomous operations based on an inner state thereof, the robot apparatus comprising:
    rotation means for enabling rotation in at least one of a portion of said body trunk and a neck unit;
    sound source direction estimating means for estimating the sound source direction; and
    controlling means for performing control so that, on occurrence of a sound event, the front side of said head unit is directed to said sound source direction through said leg units and/or said rotation means,
    wherein said controlling means is responsive to the relative angle of said sound source direction to the front side direction of said body trunk unit to determine the angle through which said body trunk unit is rotated through said leg units and the angle through which said head unit is rotated through said rotation means.

2. The robot apparatus according to claim 1 wherein, if the relative angle of said sound source direction to the front side direction of said body trunk unit is X which is larger than the possible angle of rotation of said rotation means, said controlling means causes the body trunk unit to rotate through Y to said sound source direction by said leg units, said controlling means also causing said head unit to rotate through X Y to said sound source direction by said rotation means.

3. The robot apparatus according to claim 1 wherein, after directing the front side of said head unit to said sound source direction, said controlling means causes the body trunk unit to rotate through X Y to said sound source direction by said leg units, said controlling means also causing said head unit to rotate through (X Y) to said sound source direction by said rotation means, to cause said head unit to face the said sound source direction aright.

4. A robot apparatus having a body trunk unit, to which are movably connected a head unit and two or more leg units, the robot apparatus executing operations responsive to an action from outside and/or autonomous operations based on an inner state thereof, the robot apparatus comprising:
    rotation means for enabling rotation in at least one of a portion of said body trunk and neck unit;
    sound source direction estimating means for estimating the sound source direction;
    controlling means for performing control so that, on occurrence of a sound event, the front side of said head unit is directed to said sound source direction through said leg units and/or said rotation means; and
    recognition means for recognizing an object by picture processing,
    wherein if, when the front side of said head unit is directed to said sound source direction, a preset object is recognized by said recognition means, said controlling means performs control to effect tracking of said preset object.

5. The robot apparatus according to claim 4 wherein said recognition means is able to recognize a human face.

6. The robot apparatus according to claim 4 wherein, if, when the front side of said head unit is directed to said sound source direction, the preset object cannot be recognized by said recognition means, said controlling means performs control to cause said head unit to be swung in the up-and-down direction and/or in the left-and-right direction through said rotation means and/or performs control to cause the apparatus to approach to said sound source direction through said leg units.

7. The robot apparatus according to claim 6 further comprising:
distance estimating means for estimating the distance to a sound source;
said controlling means causing changes in the order of priority of the operation of swinging the head unit in the up-and-down direction and/or in the left-and-right direction through said rotation means and the operation of approaching the apparatus to said sound source through said leg units depending on the distance to said sound source estimated by said distance estimating means.

8. The robot apparatus according to claim 6 further comprising:
preset outputting means; wherein if, when the head unit is swung in the up-and-down direction and/or in the left-and-right direction through said rotation means and/or when the apparatus is approached to said sound source by said leg units, said preset object has not been recognized by said recognition means, that purport is output by said outputting means.

9. The robot apparatus according to claim 8 wherein said object is the human being and wherein, if the object has not been recognized by said recognition means, the human being is requested to re-input the speech.

10. A method for controlling the operation of a robot apparatus, having a body trunk unit, to which are movably connected a head unit and two or more leg units, the robot apparatus executing operations responsive to an action from outside and/or autonomous operations based on the inner state thereof, said method comprising:
a sound source direction estimating step of estimating the sound source direction; and
a turning step of directing the front side of said head unit to said sound source direction by rotation means which, on occurrence of a sound event, causes rotation in different directions of said body trunk unit and said head unit in said leg units and/or at least one of a portion of said body trunk unit and a neck unit,
wherein said turning step is responsive to the relative angle of said sound source direction to the front side direction of said body trunk unit to determine the angle through which said body trunk unit is rotated through said leg units and the angle through which said head unit is rotated through said rotation means.

11. The method for controlling the operation of a robot apparatus according to claim 10 wherein, if the relative angle of said sound source direction to the front side direction of said body trunk unit is X which is larger than the possible angle of rotation of said rotation means, said turning step causes the body trunk unit to rotate through Y to said sound source direction by said leg units, said turning step also causing said head unit to rotate through X Y to said sound source direction by said rotation means.

12. The method for controlling the operation of a robot apparatus according to claim 10 further comprising:
a step of causing the front side of said head unit to face the sound source aright by causing the front side of said head unit to said sound source direction, causing the body trunk unit to rotate through X Y to said sound source direction by said leg units, and causing said head unit to rotate through (X Y) to said sound source direction by said rotation means to cause said head unit to face said sound source direction aright.

13. A method for controlling the operation of a robot apparatus, having a body trunk unit, to which are movably connected a head unit and two or more leg units, the robot apparatus executing operations responsive to an action from outside and/or autonomous operations based on the inner state thereof, said method comprising:
a sound source direction estimating step of estimating the sound source direction; and
a turning step of directing the front side of said head unit to said sound source direction by rotation means which, on occurrence of a sound event, causes rotation in different directions of said body trunk unit and said head unit in said leg units and/or at least one of a portion of said body trunk unit and a neck unit,
wherein the robot apparatus includes recognition means for recognizing an object by picture processing, said method further comprising:
a tracking step of tracking said object if, when the front side of said head unit has been turned to said sound source direction, the preset object is recognized by said recognition means.

14. The method for controlling the operation of a robot apparatus according to claim 13 wherein said recognition means is able to recognize a human face.

15. The method for controlling the operation of a robot apparatus according to claim 13 wherein, if, when the front side of said head unit is directed to said sound source direction, the preset object cannot be recognized by said recognition means, control is performed to cause said head unit to be swung in the up-and-down direction and/or in the left-and-right direction through said rotation means and/or to cause the apparatus to approach to said sound source direction through said leg units.

16. The method for controlling the operation of a robot apparatus according to claim 15 wherein the robot apparatus includes distance estimating means for estimating the distance to a sound source; and wherein
the order of priority of the operation of swinging the head unit in the up-and-down direction and/or in the left-and-right direction through said rotation means and the operation of approaching the apparatus to said sound source through said leg units is varied depending on the distance to said sound source estimated by said distance estimating means.

17. The method for controlling the operation of a robot apparatus according to claim 15 wherein the robot apparatus includes preset outputting means; wherein
if, when the head unit is swung in the up-and-down direction and/or in the left-and-right direction through said rotation means and/or when the apparatus is approached to said sound source by said leg units, said preset object has not been recognized by said recognition means, that purport is output by said outputting means.

18. The method for controlling the operation of a robot apparatus according to claim 17 wherein said object is the human being and wherein, if the object has not been recognized by said recognition means, the human being is requested to re-input the speech.

* * * * *